United States Patent [19]
Cenens et al.

[11] Patent Number: 5,925,724
[45] Date of Patent: *Jul. 20, 1999

[54] USE OF POLYDIENE DIOLS IN THERMOPLASTIC POLYURETHANES

[75] Inventors: Jozef Lucien Rudolf Cenens, Sugar Land; Hector Hernandez, Houston, both of Tex.

[73] Assignee: Shell Oil Company, Houston, Tex.

[ * ] Notice: This patent is subject to a terminal disclaimer.

[21] Appl. No.: 08/494,639

[22] Filed: Jun. 23, 1995

[51] Int. Cl.$^6$ .......................... C08G 18/62; C08G 18/32; C08F 8/30

[52] U.S. Cl. ............................ 528/85; 525/123; 525/131; 528/75

[58] Field of Search ....................... 528/75, 85; 525/123, 525/131

[56] References Cited

U.S. PATENT DOCUMENTS

| | | | |
|---|---|---|---|
| H1564 | 7/1996 | St. Clair | 525/98 |
| 3,427,366 | 2/1969 | Verdol et al. | 525/126 |
| 3,598,882 | 8/1971 | Brinkmann | 525/445 |
| 3,895,149 | 7/1975 | Sheffler et al. | 428/94 |
| 3,987,012 | 10/1976 | Statton | 528/75 |
| 4,053,446 | 10/1977 | Watabe et al. | 528/480 |
| 4,107,256 | 8/1978 | Conrad et al. | 264/310 |
| 4,245,081 | 1/1981 | Quiring et al. | 528/65 |
| 4,329,277 | 5/1982 | Murphy | 523/122 |
| 4,371,684 | 2/1983 | Quiring et al. | 528/65 |
| 4,376,834 | 3/1983 | Goldwasser et al. | 521/159 |
| 4,507,430 | 3/1985 | Shimada et al. | 524/839 |
| 4,532,316 | 7/1985 | Henn | 528/59 |
| 4,582,879 | 4/1986 | Frisch et al. | 525/424 |
| 4,603,188 | 7/1986 | Kusakawa et al. | 528/60 |
| 4,705,721 | 11/1987 | Frisch et al. | 428/349 |
| 4,722,946 | 2/1988 | Hostettler | 521/158 |
| 5,013,811 | 5/1991 | Ross | 528/60 |
| 5,167,899 | 12/1992 | Jezie | 264/510 |
| 5,318,813 | 6/1994 | Flexman, Jr. | 428/36.9 |
| 5,344,882 | 9/1994 | Flexman | 525/131 |
| 5,393,843 | 2/1995 | Handlin, Jr. et al. | 525/379 |
| 5,405,911 | 4/1995 | Handlin, Jr. et al. | 525/139 |
| 5,486,570 | 1/1996 | St. Clair | 525/123 |
| 5,545,691 | 8/1996 | Bening et al. | 525/102 |
| 5,589,543 | 12/1996 | Yokelson et al. | 525/131 |

FOREIGN PATENT DOCUMENTS

| | | |
|---|---|---|
| 87/73299 | 1/1987 | Australia . |
| 0020774 | 7/1981 | European Pat. Off. . |
| 0 047 081 | 3/1982 | European Pat. Off. . |
| 0114185 | 1/1984 | European Pat. Off. . |
| 0380389 | 1/1990 | European Pat. Off. . |
| 0 624 612 A1 | 11/1994 | European Pat. Off. . |
| 2742879 | 5/1979 | Germany . |
| 87017845 | 5/1985 | Japan . |
| 0 1138 220 | 11/1987 | Japan . |
| 88015294 | 4/1988 | Japan . |
| 0 3016 702 | 6/1989 | Japan . |
| 90051950 | 6/1990 | Japan . |
| 91013269 | 2/1991 | Japan . |
| 94041580 | 6/1994 | Japan . |
| 2270317 | 9/1994 | United Kingdom . |

OTHER PUBLICATIONS

Y.Camberlin, et al, "Model Hard Segments from Diphenyl Methane Diisocyanate and Different Chain Extenders, and Corresponding Linear Block Polyurethanes" *Journal of Polymer Science: Polymer Chemistry Edition*, 20 1445–1456 (1982).

L. Cuve, et al "Synthesis and Properties of Polyurethanes Based on Polyolefin: 1. Rigid Polyurethanes and Amorphous Segmented Polyurethanes Prepared in Polar Solvent Under Homogeneous Conditions", *Polymer*, 32(2)343–352 (1991).

L. Cuve, et al, "Synthesis and Properties of Polyurethanes Based on Polyolefin: 2. Semicrystalline Segmented Polyurethanes Prepared Under Heterogeneous or Homogeneous Synthesis Conditions" *Polymer*, 33(18) 3957–3967 (1992).

G. Boiteux, et al, "Synthesis and Properties of Polyurethanes Based on Polyolefin: 3. Monitoring of Phase Separation by Dielectric Relaxation Spectroscopy of Segmented Semicrystalline Polyurethane Prepared in Bulk by the Use of Emulsifiers", *Polymer* 35(1) 173–178 (1994).

S. Etienne, et al, "Microstructure of Segmented Amorphous Polyurethanes: Small–angle X–ray Scattering and Mechanical Spectroscopy Studies", *Polymer* 35 (13) 2737–2743 (1994).

R.L. Zapp, et al, "Isocyanate Reactions with Difunctional Polyisobutylenes" *Rubber Chemistry and Technology*, 1154–1187 (1970).

V.S.C. Chang, et al, "Gas Permeability, Water Adsorption, Hydrolytic Stability and Air–Oven Aging of Polyisobutylene–Based Polyurethane Networks" *Polymer Bulletin* 8 69–74 (1982).

R.R. Lagasse, "Domain Structure and Time–Dependent Properties of a Crosslinked Urethane Elastomer" *Journal of Applied Polymer Science* 21: 2489–2503 (1977).

K. Ono, et al, "Effects of Number–Average Molecular Weight of Liquid Hydroxyl–Terminated Polybutadiene on Physical Properties of the Elastomer" *Journal of Applied Polymer Science* 21 3223–3235 (1977).

C.M. Brunette, et al "Structural and Mechanical Properties of Polybutadiene–Containing Polyurethanes" *Polymer Engineering and Science* 21(3) 163–171 (1981).

(List continued on next page.)

*Primary Examiner*—Rabon Sergent
*Attorney, Agent, or Firm*—Donald F. Haas

[57] ABSTRACT

Thermoplastic polyurethanes are formed from a polydiene diol, preferably a hydrogenated polybutadiene diol, having from 1.6 to 2 terminal hydroxyl groups per molecule and a number average molecular weight between 500 and 20,000, an isocyanate having two isocyanate groups per molecule, and optionally a chain extender having two hydroxyl groups per molecule. The thermoplastic polyurethane composition is prepared by a prepolymer method. preferably a solventless prepolymer method using the branched chain extender.

9 Claims, No Drawings

OTHER PUBLICATIONS

M. Xu, et al, "Structure and Morphology of Segmented Polyurethanes: 1. Influence of Incompatibility on Hard–Segment Sequence Length" *Polymer* 24 1327–1332 (1993).

C.H.Y. Chen, et al, "Structure and Morphology of Segmented Polyurethanes: 2. Influence of Reactant Incompatibility" *Polymer* 24 1333–1340 (1983).

J.A. Verdol, et al, "Liquid Castable Elastomers from Hydroxyl–Terminated Polybutadienes. Part 1—Hydroxyl–Terminated Polybutadienes in One–Step Urethane Reactions" *Rubber Age* 57–64, Jul. 1966.

Sinsiskii, et al, "Thermoplastic Polydiene Urethane Block Copolymers and Their Dynamic Mechanical Properties" *Uretanouye Elastomery* 132–138 (1972).

"Hydroxyl Terminated PolyBD Resins in Urethane Elastomers" Sartomer Company Sales Brochure (1988).

P.H. Eachger, "PolyBD in Polyurethane Sealants", *Adhesion*, No. 1, 7–9, Jan./Feb. 1992.

A.G. Makhmurov, et al, "Properties of Polydieneurethane Thermoplastic Elastomers" *Obuv. Prom.* 13(5) 47–50 (1971).

V.P. Kaclzheva, et al, "Preparation of Unsaturated Polyurethane Rubbers by using Hydroxylated Polydiene" *Tr. Kazan Khim. Technol. Inst.* No. 36 451–456 (1967).

M. Zachcriesiewicz, "Urethanes a Base de Resines de PolyBD pour Performances Electriques" *Caoutchaucs et Plastics,* No. 665, 33–37, Dec. 1986.

USE OF POLYDIENE DIOLS IN THERMOPLASTIC POLYURETHANES

FIELD OF THE INVENTION

This invention relates to thermoplastic polyurethane elastomer compositions containing a polymeric diol, especially polyurethane compositions containing an anionically polymerized diol having two terminal hydroxyl groups.

BACKGROUND OF THE INVENTION

Cast and thermoplastic polyurethane compositions based on the reaction of polyisocyanates with polymeric diols are well known for use as elastomers, adhesives, sealants, elastomeric surface coatings, and coatings for metals and plastics. Kuraray markets a hydrogenated polyisoprene diol which is described in product brochures as useful in making polyurethanes when reacted with isocyanates and various chain extenders. The diol has a number average molecular weight of 3800, a broad molecular weight distribution and a hydroxyl content of about 2.2 terminal hydroxyl groups per molecule. Typically the hydrogenation of this product is around 80%.

The isocyanates described by Kuraray include MDI, IPDI, and TDI. The chain extenders described by Kuraray include 1,4-butane diol, 2-ethyl 1,3 hexane diol, 3-methyl 1,5 pentane diol and 1,9 nonane diol. The polyurethanes have properties consistent with addition of a 3800 molecular weight hydrogenated polyisoprene to the polyurethane structure, including good hydrolysis resistance.

The average functionality of the Kuraray materials being above 2 makes these products unsuitable for thermoplastic polyurethane application. Thermoplastic polyurethanes (TPU) allow the production of elastomeric materials by thermoplastic processing techniques. TPU's may not thermally degrade when repeatedly plasticized by the influence of temperature and pressure. Therefore the TPU macromolecules have to be linear and not branched macromolecules which cannot be repeatedly thermoformed. Only bifunctional isocyanates, chain extenders and long chain diols can be used to make thermoplastic polyurethanes.

It is an object of the present invention to provide thermoplastic polyurethane compositions having enhanced physical properties and hydrolysis resistance.

SUMMARY OF THE INVENTION

The present invention is polyurethane compositions comprising polydiene diols having from 1.6 to 2, more preferably 1.8 to 2, and most preferably 1.9 to 2, terminal hydroxyl groups per molecule and a number average molecular weight between 500 and 20,000, more preferably between 1,000 and 10,000, an isocyanate having two isocyanates groups per molecule, and a low molecular weight chain extender having two hydroxyl groups per molecule. The polyurethane compositions containing polydiene diols have improved physical properties in comparison to polyurethane compositions containing hydrogenated polyisoprene polyols and are suitable for thermoplastic polyurethane applications.

DETAILED DESCRIPTION OF THE INVENTION

The present invention is compositions for making thermoplastic polyurethanes comprising polydiene diols having from 1.6 to 2, more preferably 1.8 to 2, and most preferably 1.9 to 2, terminal hydroxyl groups per molecule and a number average molecular weight between 500 and 20,000, more preferably between 1,000 and 10,000, an isocyanate having two isocyanate groups per molecule, and optionally a low molecular weight chain extender having two hydroxyl groups per molecule. The thermoplastic polyurethane compositions made from polydiene diols have good physical and excellent weathering properties and, in comparison to known polyurethane compositions containing hydrogenated polyisoprene polyols, are suitable for thermoplastic polyurethane applications.

The polydiene diols used in this invention are prepared anionically such as described in U.S. Pat. Nos. 5,376,745, 5,391,663, 5,393,843, 5,405,911, and 5,416,168 which are incorporated by reference herein. The polydiene diols have from 1.6 to 2, more preferably from 1.8 to 2, and most preferably from 1.9 to 2 terminal hydroxyl groups per molecule, and a number average molecular weight between 500 and 20,000, more preferably between 1000 and 10,000. Hydrogenated polybutadiene diols are preferred and have 1,4-addition between 30% and 70% to minimize viscosity.

Polymerization of the polydiene diols commences with a monolithium or dilithium initiator which builds a living polymer backbone at each lithium site. The conjugated diene is typically 1,3-butadiene or isoprene. The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,4-addition. The optimum balance between low viscosity and high solubility in a hydrogenated polybutadiene polymer occurs at a 60/40 ratio of 1,4-butadiene/1,2-butadiene. This butadiene microstructure is achieved during polymerization at 50° C. in cyclohexane containing about 6% by volume of diethylether or about 1000 ppm of glyme.

Anionic polymerization is terminated by addition of a functionalizing agent like those in U.S. Pat. Nos. 5,391,637, 5,393,843, and 5,418,296, which are also incorporated by reference, but preferably ethylene oxide, prior to termination.

The preferred di-lithium initiator is formed by reaction of two moles of sec-butyllithium with one mole of diisopropylbenzene. This diinitiator is used to polymerize butadiene in a solvent composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked as the silyl ether (as in U.S. Pat. Nos. 5,376,745 and 5,416,168 which are also incorporated by reference). A suitable initiator is hydroxypropyllithium in which the hydroxyl group is blocked as the trimethylsilyl ether. This mono-lithium initiator can be used to polymerize butadiene in hydrocarbon or polar solvent. The molar ratio of initiator to monomer determines the molecular weight of the polymer. The living polymer is then capped with one mole of ethylene oxide and terminated with one mole of methanol to yield the monohydroxy polydiene polymer. The silyl ether is then removed by acid catalyzed cleavage in the presence of water yielding the desired dihydroxy polydiene diol.

The polybutadiene diols are hydrogenated such that at least 90%, preferably at least 95%, of the carbon to carbon double bonds in the diols are saturated. Hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum.

The polybutadiene polymers have no less than about 40% 1,2-butadiene addition because, after hydrogenation, the polymer will be a waxy solid at room temperature if it contained less than about 40% 1,2-butadiene addition. To minimize viscosity of the diol, the 1,2-butadiene content should be between about 40 and 60%. The isoprene polymers have no less than 80% 1,4-isoprene addition in order to reduce Tg and viscosity. The diene microstructures are typically determined by $C^{13}$ nuclear magnetic resonance (NMR) in chloroform.

The polydiene diols have hydroxyl equivalent weights between about 250 and about 10,000, preferably between 500 and 5,000. Thus, for di-hydroxy polydiene polymers, suitable peak molecular weights will be between 500 and 20,000, preferably between 1,000 and 10,000.

The peak molecular weights referred to here are peak molecular weights measured by gel permeation chromatography (GPC) calibrated with polybutadiene standards having known peak molecular weights. The solvent for the GPC analyses is tetrahydrofuran.

The isocyanate used in this invention is a diisocyanate having a functionality of two isocyanate groups per molecule, since they produce thermoplastic polyurethane compositions when combined with a true diol. Examples of suitable diisocyanates are 4,4'-diphenylmethane diisocyanate, mixtures of isomers of diphenylmethane diisocyanate, toluene diisocyanate, isophoronediisocyanate, hexamethylenediisocyanate, ethylenediisocyanate, etc.

The chain extender used to make the polyurethane compositions are low molecular weight diols having two hydroxyl groups per molecule. The prefered chain extenders have methyl, ethyl, or higher carbon side chains which make these diols more apolar and therefore more compatible with the apolar hydrogenated polydienes. Examples of such chain extenders are 2-ethyl-1,3-hexanediol, 2-ethyl-2-butyl 1,3 propane diol and 2,2,4-trimethyl-1,3-pentane diol. Linear chain extenders without carbon side chains such as 1,4-butane diol, ethylene diamine, 1,6-hexane diol, and the like, also result in polyurethane compositions if a solvent prepolymer method is used to avoid incompatibility.

A preferred way to make TPU's is by the prepolymer method where the isocyanate component is reacted first with the polydiene diol to form a isocyanate terminated prepolymer, which can then be reacted further with the chain extender of choice. The polyurethane compositions can be formulated to make elastomers using a solventless prepolymer method or a solvent/prepolymer method as described in more detail below.

In the solventless prepolymer method, the polydiene diol is heated to at least 70° C. and not more than 100° C., and then mixed with the desired amount of isocyanate for a at least 2 hours under nitrogen flow. The desired amount of chain extender is added and thoroughly mixed before quickly degassing the mixture under vacuum. The mixture is then poured into a heated mold treated with a mold release compound. The polyurethane composition is formed by curing into the mold for several hours and then postcuring the TPU above 110° C. for at least 2 hours.

In the solvent/prepolymer method, the polydiene diol is dissolved in a solvent, preferably dry toluene, heated to at least 70° C. and not more than 100° C., and then mixed with an isocyanate having two isocyanates group per molecule for a at least 2 hours under nitrogen flow. The desired type and amount of chain extender is added and thoroughly mixed until the reaction is complete. The mixture is then poured into an aluminum pan to evaporate the solvent and then postcured for at least 2 hours at 110° C. while under vacuum. The thermoplastic polyurethane composition can then be heat pressed above the elastomer melting point to form an elastomeric polyurethane article.

A composition of the instant invention may contain plasticizers, such as oils used in conventional rubber compounds. Such oils can be used in the present TPU's because the polydiene diol is a rubber. Rubber compounding oils are well-known in the art and include both high saturates content oils and high aromatics content oils. Preferred plasticizers are highly saturated oils (like Tufflo® 6056 and 6204 oil made by Arco) and process oils (like Shellflex® 371 oil made by Shell). The amounts of rubber compounding oil employed in the invention composition can vary from 0 to about 500 phr, preferably between about 0 to about 100 phr, and most preferably between about 0 and about 60 phr.

A wide variety of fillers can be used in formulations with the present invention. Suitable fillers include calcium carbonate, clays, talcs, zinc oxide, titanium dioxide, silica and the like. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the polyisocyanate and the saturated, polyhydroxylated polydiene polymer.

Stabilizers known in the art may also be incorporated into the composition. These may be for protection during the life of the sealant or adhesive against, for example, oxygen, ozone and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. If the adhesive will be mixed at high temperature or if the product must survive many years in service, stabilizer concentration could be as much as about 10 phr.

DETAILED DESCRIPTION OF PREFERRED EMBODIMENTS

The preferred embodiment of the present invention is compositions for making thermoplastic polyurethanes comprising from 80 to 100 parts of a hydrogenated polybutadiene diol having from 1.9 to 2.0 terminal hydroxyl groups per molecule, 1,4-addition between 40% and 60%, and a number average molecular weight between 1,000 and 10,000, from 90 to 100 index amount of an isocyanate having two isocyanate groups per molecule, and from 0 to 20 parts of a branched chain extender selected from a group consisting of 2-ethyl-1,3-hexane diol and 2,2,4-trimethyl1,3-pentanediol. The polyurethane compositions made from hydrogenated polybutadiene diols have improved physical properties in comparison to polyurethane compositions containing hydrogenated polyisoprene polyols, and are thermoplastic polyurethanes.

The following examples show that thermoplastic polyurethane compositions are produced using the solventless prepolymer method with branched chain extenders such as 2-ethyl-1,3-hexane diol.

EXAMPLE 1

A linear, hydrogenated butadiene diol polymer having 1.95 terminal hydroxyl groups per molecule, a number average molecular weight of 3650, and a 1,2-addition of butadiene of 43%, was obtained from Shell Chemical labelled HPVM 2201. This polymer is a viscous liquid at 25° C. but flows readily at slightly elevated temperatures (20 poise viscosity at 60° C.).

A thermoplastic polyurethane elastomer was produced by dissolving 95 parts of the hydrogenated polybutadiene diol in 285 parts of dry toluene and heating the mixture to 80° C. Then 15.0 parts of RUBINATE 44, a pure 4,4'-diphenylmethane diisocyanate of functionality 2.0 was added. The components were mixed for 3 hours at 80° C. under nitrogen flow. Then 5 parts of 2-ethyl 1,3 hexanediol was added, and the mixture was stirred at 80° C. until it started to gel. The mixture was then poured into an aluminum pan and the solvent was evaporated overnight. The mixture was then postcured for 2 hours at 110° C. under vacuum. The resulting polyurethane elastomeric composition was passed through a heated press to form an elastomeric sheet. The sheet had a total hard phase content of 17.4% and a Shore A hardness of 60. A Kuraray report an elastomer made with 92.2 parts of their TH-1 polyisoprene polyol, 7.8 parts of 2-ethyl 1,3-hexane diol and 20.3 parts of 4,4'diphenylmethane diisocyanate. For a hard phase content of 23.3%, the Shore A hardness reported is only 59 (the higher the hard phase content, the higher the hardness should be).

EXAMPLE 2

The diol from Example 1 was used to make a thermoplastic elastomer. The elastomer was produced by dissolving 90 parts of the hydrogenated polybutadiene diol in 285 parts of dry toluene and heating the mixture to 80° C. Then 23.3 parts of RUBINATE 44, a pure 4,4'-diphenylmethane diisocyanate of functionality 2.0 was added. The components were mixed for 3 hours at 80° C. under nitrogen flow. Then 10 parts of 2-ethyl 1,3 hexanediol were added, and the mixture was stirred at 80° C. until it started to gel. The mixture was then poured into an aluminum pan and the solvent was evaporated overnight. The mixture was then postcured for 2 hours at 110° C. under vacuum. The resulting polyurethane elastomeric composition was passed through a heated press to form an elastomeric sheet. The sheet had a Shore A hardness of 72 for a hard phase content of 27%. This elastomer was also tested for its hydrolysis resistance. Samples were immersed for 5 weeks in distilled water at 95° C. The weight increase after the immersion period was only 0.8% and the Shore A hardness reduced by 2.1%. (A normal test for urethane elastomers is 2 weeks immersion at 70° C., and a weight increase of 2% is considered good.)

EXAMPLE 3

The diol from Example 1 was used to make a thermoplastic elastomer. The elastomer was produced by dissolving 85 parts of the hydrogenated polybutadiene diol in 285 parts of dry toluene and heating the mixture to 80° C. Then 31.6 parts of RUBINATE 44, a pure 4,4'-diphenylmethane diisocyanate of functionality 2.0 was added. The components were mixed for 3 hours at 80° C. under nitrogen flow. Then 15 parts of 2-ethyl 1,3 hexanediol were added, and the mixture was stirred at 80° C. until it started to gel. The mixture was then poured into an aluminum pan and the solvent was evaporated overnight. The mixture was then postcured for 2 hours at 110° C. under vacuum. The resulting polyurethane elastomeric composition was passed through a heated press to form an elastomeric sheet. The sheet had a Shore A hardness of 80 for a hard phase content of 35.4%.

EXAMPLE 4

The diol from Example 1 was used to make a thermoplastic elastomer. The elastomer was produced by dissolving 25 parts of the hydrogenated polybutadiene diol in 75 parts of dry toluene and heating the mixture to 80° C. Then 3.4 parts of RUBINATE 44, a pure 4,4'-diphenylmethane diisocyanate of functionality 2.0 was added. The components were mixed for 3 hours at 80° C. under nitrogen flow. Then 0.6 parts of 1,4-butanediol were added, and the mixture was stirred at 80° C. until it started to gel. The mixture was then poured into an aluminum pan and the solvent was evaporated overnight. The mixture was then postcured for 2 hours at 110° C. under vacuum. The resulting polyurethane elastomeric composition was passed through a heated press to form an elastomeric sheet. The sheet had a Shore A hardness of 60 and a hard phase content of 13.8%.

We claim:

1. A composition for making thermoplastic polyurethanes, comprising:

a hydrogenated polybutadiene diol having at least 90% of the carbon-carbon double bonds saturated, from 1.6 to 2 terminal hydroxyl groups per molecule, from 30–70% 1,2-addition, and a number average molecular weight between 500 and 20,000;

an isocyanate having two isocyanate groups per molecule; and optionally a low molecular weight chain extender having two hydroxyl groups per molecule.

2. The composition of claim 1, wherein the polybutadiene diol has from 1.9 to 2 hydroxyl groups per molecule.

3. The composition of claim 1, wherein the polybutadiene diol has a number average molecular weight between 1,000 and 10,000.

4. The composition of claim 1, wherein the isocyanate is 4,4'-diphenylmethane diisocyanate.

5. The composition of claim 1, wherein the composition comprises the chain extender which is selected from a group consisting of 2-ethyl-1,3-hexane diol and 2,2,4-trimethyl-1,3-pentanediol.

6. The composition of claim 5, wherein the chain extender is 2-ethyl-1,3-hexane diol.

7. A composition for making thermoplastic polyurethanes, comprising:

from 80 to 100 parts of a hydrogenated polybutadiene diol having from 1.9 to 2.0 terminal hydroxyl groups per molecule, 1,2-addition between 40% and 60%, and a number average molecular weight between 1,000 and 10,000, wherein at least 90% of the carbon-carbon double bonds are saturated;

from 90 to 100 index amount of an isocyanate having two isocyanate groups per molecule; and from 0 to 20 parts of a branched chain extender selected from a group consisting of 2-ethyl-1,3-hexane diol and 2,2,4-trimethyl-1,3-pentanediol.

8. The composition of claim 7, wherein the isocyanate is 4,4'-diphenylmethane diisocyanate.

9. The composition of claim 8, wherein the chain extender is 2-ethyl-1,3-hexane diol.

* * * * *